(12) United States Patent
Wallmo et al.

(10) Patent No.: US 9,475,833 B2
(45) Date of Patent: Oct. 25, 2016

(54) METHOD FOR LIGNIN SEPARATION FROM BLACK LIQUOR COMPRISING REMOVAL OF SULFUR COMPOUNDS FROM FORMED WATER EFFLUENT

(75) Inventors: Henrik Wallmo, Alingsås (SE); Martin Wimby, Torslanda (SE)

(73) Assignee: VALMET POWER AB, Sundsvall (SE)

( * ) Notice: Subject to any disclaimer, the term of this patent is extended or adjusted under 35 U.S.C. 154(b) by 111 days.

(21) Appl. No.: 14/127,173

(22) PCT Filed: Jun. 28, 2011

(86) PCT No.: PCT/SE2011/050861
§ 371 (c)(1),
(2), (4) Date: Jun. 27, 2014

(87) PCT Pub. No.: WO2013/002687
PCT Pub. Date: Jan. 3, 2013

(65) Prior Publication Data
US 2014/0357847 A1    Dec. 4, 2014

(51) Int. Cl.
*D21C 11/00* (2006.01)
*C07G 1/00* (2011.01)
*C08H 7/00* (2011.01)
*C08H 8/00* (2010.01)

(52) U.S. Cl.
CPC ..... *C07G 1/00* (2013.01); *C08H 6/00* (2013.01); *C08H 8/00* (2013.01); *D21C 11/0007* (2013.01); *Y02P 40/44* (2015.11)

(58) Field of Classification Search
CPC ................................................. D21C 11/0007
See application file for complete search history.

(56) References Cited

U.S. PATENT DOCUMENTS 2,318,919 A    5/1943    Brockman
2,445,838 A    7/1948    Melander
(Continued)

FOREIGN PATENT DOCUMENTS

| CN | 1755012 A | * | 4/2006 |
| SE | WO2006038863 | | 4/2006 |
| SE | WO2006031175 | | 3/2013 |

OTHER PUBLICATIONS

Dewent Abstract of CN 1755012, 2007.*

*Primary Examiner* — Liam J Heincer
(74) *Attorney, Agent, or Firm* — Fasth Law Offices; Rolf Fasth (57) ABSTRACT

The method is for separation of lignin from original black liquor ($BL_{IN}$) having a first precipitation phase (PR1/PR2) for precipitation of lignin by a first acidification using acidifier, $CO_2$, at alkaline conditions, then separating a lignin cake with subsequent suspension of the lignin cake in a strong acid to leach our metals from the lignin followed by dewatering and obtaining a clean lignin product LP. The acidic liquid phase ($FL_1$) subjected to a sulphur removal process wherein a calcium containing compound is added to the acidic liquid phase, whereby sulphur in the acidic liquid phase is reacting with the calcium compound forming solid gypsum which could be separated and bled off from the process. The remaining acidic liquid could then be returned to the recovery process without negatively affecting the sulphur balance of the mill.

8 Claims, 4 Drawing Sheets

(56) References Cited

U.S. PATENT DOCUMENTS

| | | | | |
|---|---|---|---|---|
| 2,701,255 | A * | 2/1955 | Heritage | D21C 11/0007 106/123.11 |
| 2,997,466 | A * | 8/1961 | Ball | D21C 11/0007 530/500 |
| 3,048,576 | A * | 8/1962 | Ball | D21C 11/0007 530/500 |
| 3,806,403 | A * | 4/1974 | Ferguson | C05C 9/02 162/16 |
| 3,875,317 | A * | 4/1975 | Ferguson | A23K 1/106 127/37 |
| 4,131,564 | A * | 12/1978 | Dilling | D06P 1/50 516/200 |
| 4,764,596 | A * | 8/1988 | Lora | C07D 307/50 162/16 |
| 5,043,432 | A * | 8/1991 | Dilling | C08H 6/00 530/500 |
| 5,254,286 | A * | 10/1993 | Gill | C02F 5/10 159/47.1 |
| 6,830,696 | B1 | 12/2004 | El-Shall | |
| 2007/0092422 | A1 | 4/2007 | Hamalainen et al. | |
| 2008/0047674 | A1* | 2/2008 | Ohman | D21C 11/0007 162/16 |
| 2008/0051566 | A1* | 2/2008 | Ohman | D21C 11/0007 530/500 |
| 2008/0214796 | A1* | 9/2008 | Tomani | D21C 11/0007 530/500 |
| 2009/0099354 | A1* | 4/2009 | Axegard | C07H 1/06 536/128 |
| 2010/0041879 | A1* | 2/2010 | Stigsson | C07G 1/00 536/127 |
| 2010/0325947 | A1* | 12/2010 | Ohman | D21C 11/0007 44/606 |
| 2014/0366870 | A1* | 12/2014 | Retsina | C08B 1/00 127/36 |
| 2014/0374039 | A1* | 12/2014 | Hogebrandt | D21C 11/04 162/30.11 |

* cited by examiner

METHOD FOR LIGNIN SEPARATION FROM BLACK LIQUOR COMPRISING REMOVAL OF SULFUR COMPOUNDS FROM FORMED WATER EFFLUENT

PRIOR APPLICATION

This application is a U.S. national phase application that is based on and claims priority from International Application No. PCT/SE2011/050861, filed 28 Jun. 2011.

TECHNICAL FIELD

This invention relates to a method for lignin separation from spent cooking liquor, called original black liquor, using a precipitation process.

BACKGROUND AND SUMMARY OF THE INVENTION

The advantages with lignin separation from black liquor is already described in WO 2006/031175 and WO2006/038863. These patents disclose the novel process Ligno-Boost™ that is now sold by Metso, and wherein WO 2006/031175 disclose the basic two stage acidic wash process and WO2006/038863 disclose an improvement of the process where sulphate or sulphate ions are added to the process.

An important aspect of the process is that the required charge of chemicals for the acidification may be high. If this is the case the cost of fresh chemicals is a large part of the operational cost and the commercial viability of the process is lower.

These problems could be reduced, if the process is optimized for minimum requirement for charges of fresh chemicals, making the lignin product commercially sound. Acidifiers in form of mill generated waste flows are thus preferable as it may solve a waste disposal problem and lessen environmental impact. As the precipitation of lignin requires acidification of alkaline black liquor flows, much of the total amount of acidifier is used to decrease the pH level down to the point of where lignin starts to precipitate. The first phase reaching this pH level typically reduce the pH level from about pH 13 in the original black liquor down to a pH level about 11.5, and normally do not involve any nucleation of lignin particles. The amount of acidifier needed is nevertheless relatively high for this first phase as the pH follows a logarithmic scale, and any following additional lowering of pH from 11.5 requires far less acidifier for the same order of lowered absolute pH value.

The Lignoboost process produce a lignin product which if used as fuel is classified as a "green" fuel as being based upon recovered fuel. The idea with classification of "green" fuels is based upon the concept not to increase the carbon dioxide footprint, i.e. the emissions, by burning fossil fuels. The most promising acids for this process is carbon dioxide for at least initial precipitation of the lignin, and then using sulfuric acid ($H_2SO_4$) for washing and leaching out metals from the lignin. The sulfuric acid could be added as a fresh sulfuric acid from a chemical supplier, or as preferred using so called "spent acid" from a chlorine dioxide generator often used at a pulp mill. The latter usage of this spent acid already at hand in most mill sites further emphasize that the lignin product is considered as a "green" fuel.

One disadvantage with using sulfuric acid is that the waste liquids from the washing process of the lignin contains a lot of sulphur and if these waste liquids are recycled to the recovery process they will end up in the recovery boiler ashes. The sulphur balance of the mill will be affected and in order to reestablish the correct sodium/sulphur balance in the cooking chemicals must fresh sodium be added at high costs. As no better acid for lignin washing has been found that match the results from using sulfuric acid as of lignin yield and practical filterability of the lignin product, a need to solve the sulphur balance of the mill is given priority.

The invention is based upon the finding that the used acidic filtrate from the acidic wash process of the precipitated lignin may be subjected to a sulphur removal process that bleed outs the sulphur in form of gypsum. By this sulphur removal process is the amount of additional sulphur recycled to the recovery process reduced significantly solving the problem with the sulphur balance.

Thus, the invention is related to a method for separation of lignin from original black liquor having a first pH value, comprising the following phases in sequence:

a first precipitation stage wherein an acidifier charge is added to the original black liquor in order to decrease the pH value of the original black liquor to a second pH level initiating precipitation of lignin whereby said second pH level is above pH7 and below 11.5, followed by a separation phase wherein the precipitated lignin is separated as a lignin cake from the remaining liquid phase of the acidified original black liquor, suspending the lignin cake in a strong acid solution establishing a pH level below 5 and maintaining the acidified lignin slurry in this slurry state for at least 2 minutes, dewatering the acidified lignin slurry obtaining a second lignin cake and at least one acidic liquid phase, and according to the inventive aspects is the acidic liquid phase subjected to a sulphur removal process wherein a calcium containing compound is added to the acidic liquid phase, whereby sulphur in the acidic liquid phase is reacting with the calcium compound forming solid gypsum, separating the solid gypsum from the acidic liquid phase and sending the remaining acidic liquid phase with reduced sulphur content to chemical recovery.

By this method could the sulphur containing acidic liquid phase be depleted from its content of sulphur in an efficient manner solving the problem with the sulphur balance of the mill, while the formed gypsum may be expelled from the process.

Preferably is the calcium containing compound calcium carbonate and that carbon dioxide is formed during the reaction and wherein at least a part of the carbon dioxide released in the sulphur removal process is used as part of the acidifier charge added to the original black liquor. By this usage of carbon dioxide generated in the process itself could the need for external supply of acidifier for the precipitation process be reduced considerably such that the lignin extraction process becomes a self sustaining process generating its own necessary chemicals.

As an alternative to the calcium containing compound could calcium acetate be used and that carbon dioxide is formed during the reaction and wherein at least a part of the carbon dioxide released in the sulphur removal process is used as part of the acidifier charge added to the original black liquor.

According to yet another aspect of the invention is acid added to the sulphur removal process in order to maintain the sulphur removal process acidic and decrease the solubility of gypsum. More of the sulphur content may thus be bound in gypsum formed. Preferably is the sulphur removal process kept at a pH in the range 4-8, and more preferably about pH 5. The acid added to the sulphur removal process is preferably an organic acid and among these organic acids are acetic acid, formic acid or citric acid found to be preferred. The organic acid could be mixed with the calcium containing compound before being added to the sulphur removal process.

Calcium carbonate could for example be soaked in organic acid in a first step, forming calcium acetate, and then thereafter adding the calcium acetate.

In order to not loose sodium with the separated solid gypsum is also preferred to wash out any residual sodium from the solid gypsum and return the wash filtrate to the evaporation stages.

It is intended throughout the present description that the expression "dewatering" embraces any means of dewatering. Preferably the dewatering is performed by using centrifugation, a filter press apparatus, a band filter, a rotary filter, such as a drum filter, or a sedimentation tank, or similar equipment, most preferred a filter press apparatus is used.

It is intended throughout the present description that the expression "original black liquor" embraces spent cooking liquor from a digester, having most of the lignin from the original cellulose material dissolved in the "original black liquor". The "original black liquor" may also have a large content of organic and inorganic material, but may also have passed through separation processes for extracting turpentine or other specific constituents, while keeping the bulk volume of dissolved lignin unaltered.

It is intended throughout the present description that the expression "lime kiln" embraces the conversion plant in the recovery island where the calcium carbonate in the lime mud obtained in the recaustizising plant is calcined to calcium oxide and reused in the lime cycle.

DETAILED DESCRIPTION OF THE INVENTION

Figure 1:
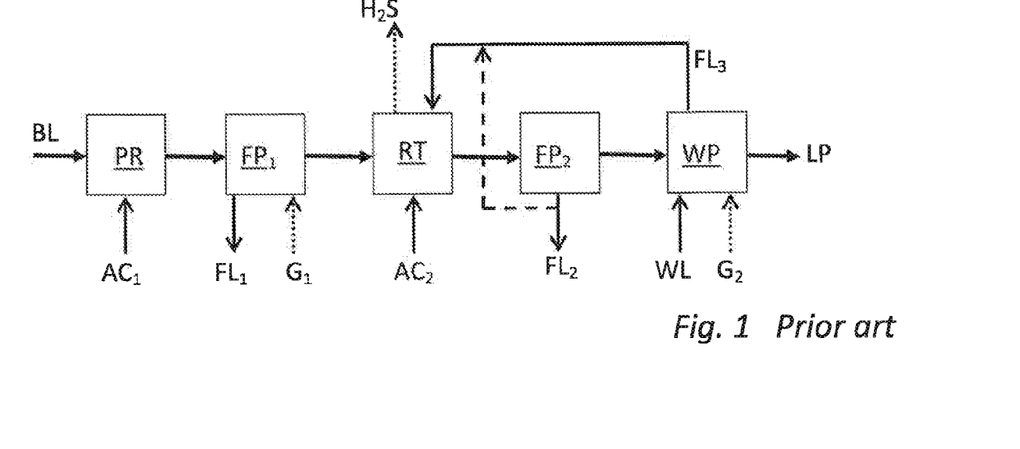
FIG. 1 shows the prior art lignin separation process according to WO 2006/031175.

In FIG. 1 is the known prior art process according to WO 2006/031175 shown. The separation of lignin from original black liquor BL comprising the following stages in sequence: Precipitation of lignin by a first acidification stage of the original black liquor $BL_{IN}$ by adding a first acid or mixture of acids $AC_1$, in any suitable precipitation reactor PR,
   followed by dewatering while forming a first filter cake with high content of lignin, said dewatering made in any suitable filter press $FP_1$, which may drain a first filtrate $FL_1$ from the lignin suspension and have addition of gas blow trough $G_1$ of the lignin cake in order to displace any residual acidic liquor,
   suspending the first lignin filter cake obtained in stage b in a second acidification stage using a second acid or mixture of acids $AC_2$, said suspension made in any suitable reslurry tank RT while discarding the odorous gases $H_2S$ emitted,
   whereupon a second lignin suspension is obtained in the reslurry tank RTm,
   dewatering of the second lignin suspension forming a second filter-/lignin cake with high content of lignin, said dewatering made in any suitable filter press $FP_2$, which may drain a second filtrate $FL_2$ from the lignin suspension, and at least a portion of this second filtrate $FL_2$ may be re-circulated back to stage c,
   washing the second filter cake, said washing made in any suitable wash apparatus WP, adding a wash liquid WL to this washing stage, and finally
   dewatering of the washed second lignin cake obtaining a lignin product LP, said dewatering preferably made in the last stages of the wash apparatus WP, which may drain a third filtrate $FL_3$ from the second filter/lignin cake, and at least a portion of this second filtrate $FL_2$ may be re-circulated back to stage c, and may also have addition of gas blow trough $G_2$ of the lignin cake in order to displace any residual acidic liquor.

Figure 2:
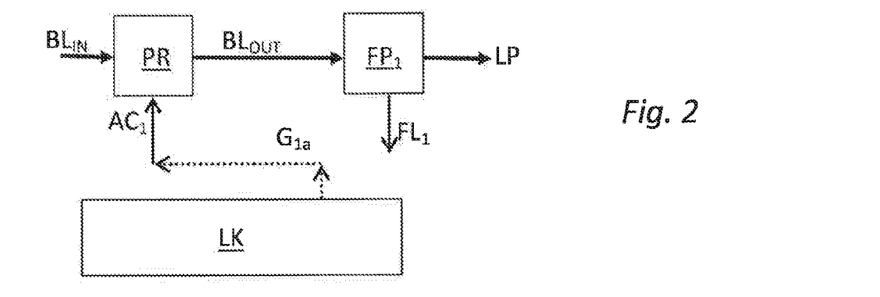
FIG. 2 shows usage of lime kiln gases in the precipitation stage.
Figure 3:
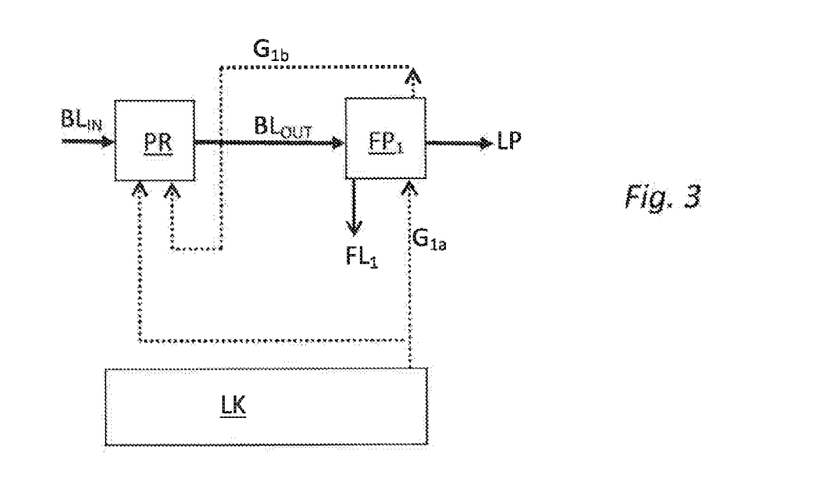
FIG. 3 shows usage of lime kiln gases in the precipitation stage as well as using at least a part of the lime kiln gases for dewatering the lignin cake/product.

In FIG. 2 is shown an alternative using flue gases $G_{1a}$ obtained from a lime kiln LK sent directly to the precipitation stage PR. Using lime kiln gases for acidification are known per se. At least a part of the first acid or mixture of acids added to the first precipitation stage could be gases rich in carbon dioxide and having its origin from flue gases vented from a lime kiln, meaning that the flue gases could be sent directly or indirectly to the precipitation stage. In FIG. 3 is shown yet an alternative where at least a part of the flue gases $G_{1a}$ vented from a lime kiln LK are first used for dewatering the lignin cake before being used as acidifier in the first precipitation stage, and the displaced residual gases $G_{1b}$ is also added to the precipitation stage PR together with lime kiln gases $G_{1a}$ sent directly to the precipitation stage.

Figure 4:
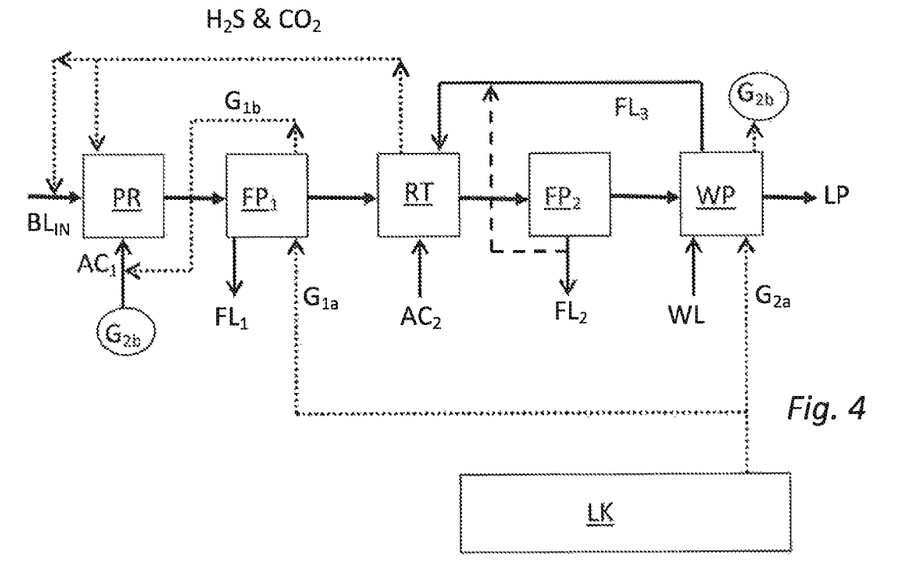
FIG. 4 shows usage of lime kiln gases in parallel in dewatering stages.

In FIG. 4 is shown a further preferred embodiment of the precipitation process according to WO 2006/031175. As disclosed earlier is the first precipitation stage PR and first dewatering stage $FP_1$ is followed by a suspension stage RT wherein the first lignin filter cake is suspended in a second acidification stage using a second acid or mixture of acids $AC_2$, whereupon a second lignin suspension is obtained. This stage is thereafter followed by a second dewatering stage $FP_2$ of the second lignin suspension forming a second filter cake with high content of lignin. A washing stage WP follows for washing the second filter cake and finally followed by a third dewatering stage of the washed second lignin cake obtaining a lignin product LP. According to the preferred embodiments of the inventive method are also the waste gases $H_2S$ & $CO_2$ emitted from the second acidification stage RT re circulated and mixed with the original black liquor in the first precipitation stage PR. The carbon dioxide formed in the reslurrying tank, originates from the sulphides and carbonates content in the lignin cake. These compounds react with the acidifier and forms carbon dioxide ($CO_2$) and hydrogen sulfide ($H_2S$), according to:

$$CO_3^{2-} + 2H^+ <-> CO_2 + H_2O$$

$$HCO_3^- + H^+ <-> CO_2 + H_2O$$

$$S^{2-} + 2H^+ <-> H_2S$$

$$HS^- + H^+ <-> H_2S$$

The formation of carbon dioxide in this process enables a further source for carbon dioxide needed for the first acidification phase, and the hydrogen sulfide is also a net contributor to the acidification as the $pK_a$ value of hydrogen sulfide is 6.89.

In this embodiment are the lime kiln gases sent directly and in parallel flows $G_{1a}$ and $G_{2a}$ to the dewatering stages $FP_1$ and WP, and the displaced residual gases $G_{1b}$ and $G_{2b}$ from these dewatering stages are collected and added to the precipitation stage PR. Here are no flue gases from the lime kiln sent directly to the precipitation stage, but rather via said dewatering stages.

Figure 5:
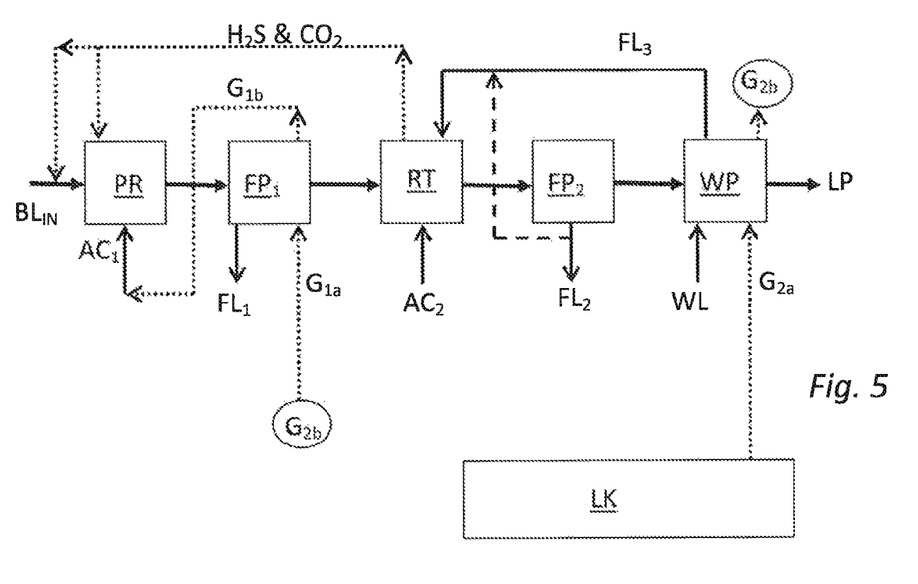
FIG. 5 shows usage of flue gases from lime kiln in series in several dewatering stages.

In FIG. 5 is shown an alternative embodiment of FIG. 4. In this embodiment is the lime kiln gases sent directly to the last dewatering stage WP, and the displaced residual gases $G_{2b}$ from this last dewatering stage are collected and added to a preceding dewatering stage, here $FP_1$. The displaced residual gases $G_{1b}$ from this preceding dewatering stage are collected and added to precipitation stage PR. Here are no flue gases from the lime kiln sent directly to the precipitation stage, but rather via usage in said dewatering stages and countercurrent to flow of lignin trough the process.

As could be understood from these examples of embodiments could direct feed and/or indirect feed to precipitation stage via dewatering stages of lime kiln flue gases be implemented in any possible ratio.

An additional procedure for stabilizing the lignin during the 2-stage process is, in combination with a pH-decrease, to adjust the ionic strength in the slurry stage, preferably with multivalent alkali metal ions or alkaline earth metal ions (e.g. calcium). At a given pH, a higher ionic strength in the suspension stage reduces the lignin yield losses. Here would also the ionic strength and pH of the wash water essentially corresponds to the conditions in the slurry stage to avoid gradients during the washing process. A higher ionic strength in the slurry and in the wash water gives a stable lignin and high lignin yield even at pH-values in the upper acidic range.

One disadvantage with the described solutions is that the acidic filtrate from dewatering stages contains a lot of sulphur, and if these acidic filtrates are sent to the recovery island then the sulphur will end up in the recovery boiler ashes and the sulphur balance will be affected needing a compensatory charge of fresh sodium in order to reestablish the correct sulphur balance.

Figure 6:
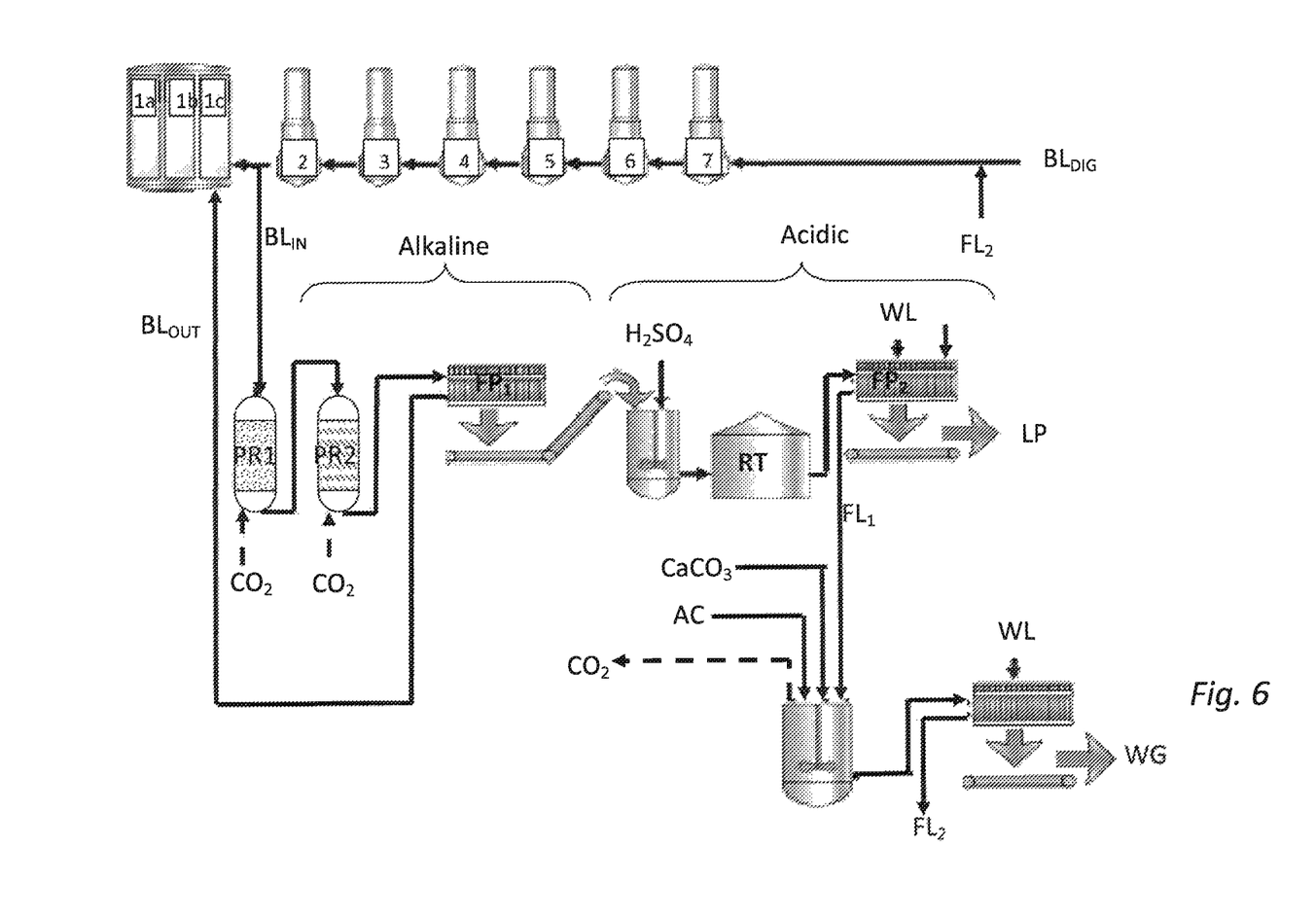
FIG. 6 shows a process chart of one example of implementation of the inventive sulphur removal process.

In FIG. 6 is the Lignoboost process disclosed with the inventive sulphur removal process. In most parts is here shown the basic stages as disclosed in previous figures, but here disclosed how the Lignoboost process is connected to the recovery operations, i.e. evaporation stages 2 to 7 receiving black liquor, $BL_{DG}$, from a digester. The original black liquor $BL_{IN}$ to be handled in the Lignoboost system is extracted after evaporation stage 2 and typically holds a dry matter concentration of about 42% and a pH of about 13. Preferably is only a part of the total flow diverted to the Lignoboost process. According to latest findings is the precipitation process divided into at least 2 phases in two towers in series, using a first precipitation tower PR1 wherein the main objective is to lower the pH level towards a starting point for precipitation of lignin nucleus particles. Preferably has this tower a random filling with filling bodies, such as Rachig rings, increasing the contact surface area between acidifier and black liquor. Typically the pH is lowered down to about 11.5 in the first tower. In the second tower PR2 is the final lowering of pH implemented and the major part of lignin precipitates here and thus this tower is of an open design allowing such lignin precipitate to flush trough. The pH at end of this second tower is about 11, and thus still alkaline. The black liquor with its content of lignin precipitate is forwarded to a subsequent dewatering apparatus, $FP_1$, which filters out the lignin precipitate as a cake, the downward arrow in figure, and the remaining liquid phase $BL_{OUT}$ of the acidified original black liquor is sent back to final evaporation stages 1a-1b-1c. The lignin cake is transported by conveyer belts to a mixing vessel where the lignin cake is suspended in a strong acid solution establishing a pH level below 5 and maintaining the acidified lignin slurry in this slurry state for at least 2 minutes in a retention tank RT. Finally the acidified lignin slurry is sent to a dewatering apparatus FP2, wherein a second lignin cake, LP is filtered out from the acidic liquid phase ($FL_1$). According to the inventive method is the acidic liquid phase $FL_1$ subjected to a sulphur removal process wherein a calcium containing compound, here $CaCO_3$, is added to the acidic liquid phase in a mixing vessel, whereby sulphur in the acidic liquid phase is reacting with the calcium compound forming solid gypsum, $CaSO_4$. The solid gypsum is thereafter separated from the acidic liquid phase in a dewatering apparatus, which may include washing water addition. The dewatered and preferably washed solid gypsum WG is bled out and the remaining acidic liquid phase $FL_2$ with reduced sulphur content is sent to chemical recovery, and preferably as shown mixed into the flow of black liquor $BL_{DIG}$ from the digester. The gypsum bled out could be sold as base material for gypsum board production or other uses, or may even be sent to landfill.

When adding $CaCO_3$ to the acidic liquid phase $FL_2$ will the pH increase to about 12 even if the acidic liquid phase has a starting pH level of about 2. At such high pH level as 12 will the solubility of gypsum, $CaSO_4$ be increased and in order to promote forming a solid phase of gypsum should acid be added, preferably an organic acid such as acetic acid, formic acid or citric acid, and in an amount such that the pH level is kept at about 5. However, gypsum formation may still be significant up to a pH of about 8, but better about pH 5. Another advantageous effect is that carbon dioxide is formed in the sulphur removal process and in such an amount that it corresponds to roughly 25-30% of the need for CO2 in the precipitation stage.

Figure 7:
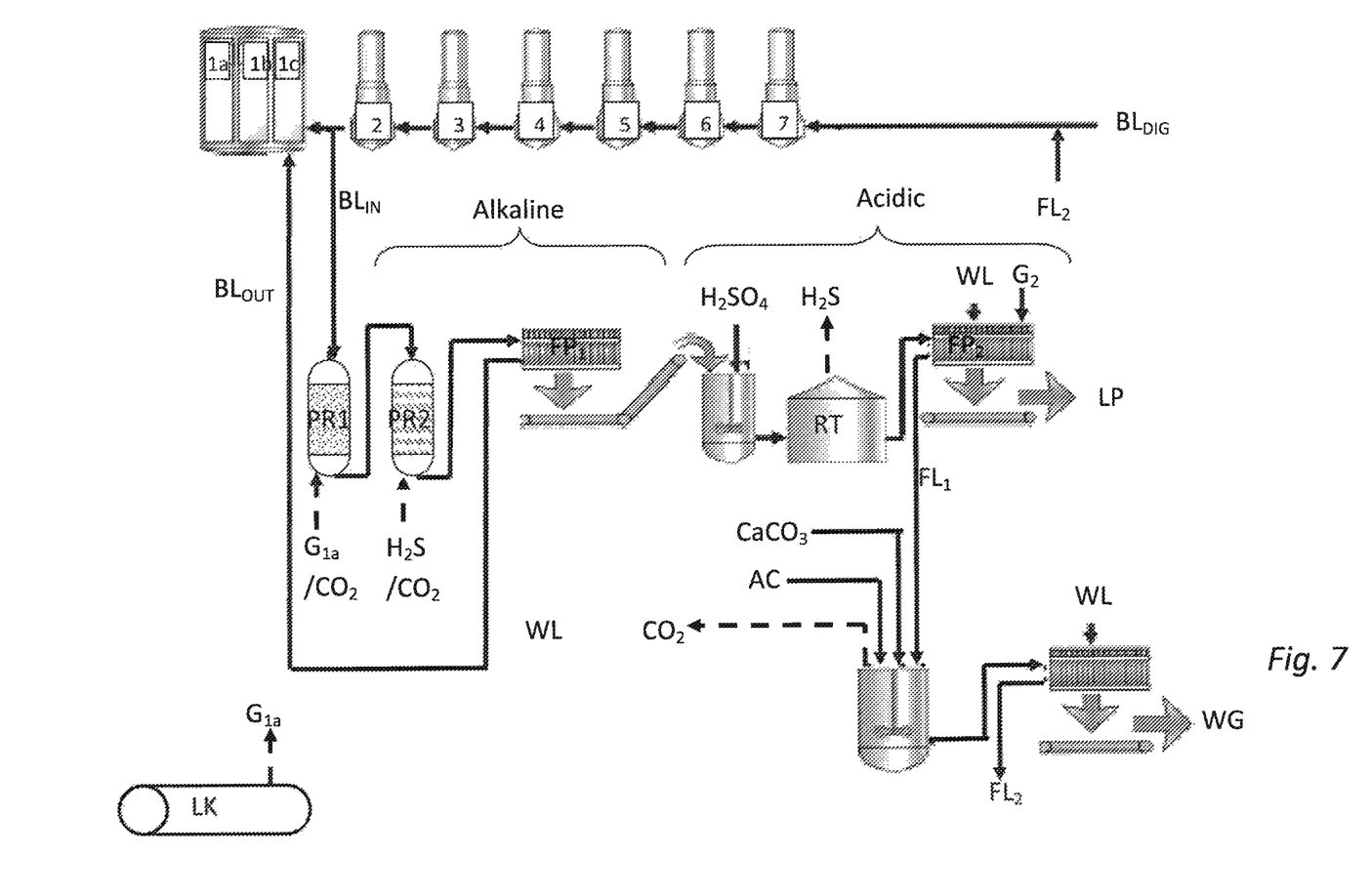
FIG. 7 shows an alternative implementation of the inventive sulphur removal process with alternative recycling of acidifiers produced in the process.

In FIG. 7 is shown an alternative set up of the system shown in FIG. 6, but indicating alternative sources for acidifier for the precipitation stage similar to the ones shown in FIGS. 1-5. Here is indicated that lime kiln gases $G_{1a}$ may be sent to first precipitation tower PR1, and that vent off gases from the suspension stage in retention tank RT may be sent to second precipitation tower PR2.

EXAMPLE

In following table is shown the costs for added chemicals to the Lignoboost process using different process solutions in a pilot plant.

In the Original Lignoboost solution is only fresh chemicals from a chemical producer used, i.e. concentrated carbon dioxide ($CO_2$) as acidifier for the precipitation stage and sulfuric acid (H2SO4) for the acidic cleaning stages. The costs for chemical charge is roughly 132.6 USD per ton of lignin produced.

In next column is also vent gases from the suspension stage, RT(gas), recirculated as acidifying gas to the precipitation stage, other conditions equal to Original Lignoboost. The cost for $CO_2$ drops from about 33 down to about 23 USD per ton of lignin produced, i.e. almost 30%. However total costs for chemical charge is still relatively high at 122.6 USD per ton of lignin produced.

In the third column is the inventive sulphur removal process, GP, implemented besides venting gases from the suspension stage, RT(gas), as acidifying gas to the precipitation stage, other conditions equal to Original Lignoboost. What could be seen here is that the need for adding sodium, NaOH, in order to maintain the sulphur balance is reduced from 81.9 USD per ton of lignin to no cost at all. In the previous process solutions was this sodium make up corresponding to some 61-66% of the total production costs for lignin. By this inventive process modification is the total costs for chemical charge reduced down to some 77 USD per ton of lignin produced, i.e. a reduction of about 38-42%.

In the final fourth column is also vent gases, GP(gas), from the sulphur removal process vented and used as acidifying gas to the precipitation stage. The costs for $CO_2$ will thus be reduced from 23.23 USD per ton of lignin down to 9.7 USD per ton of lignin, i.e. a cost reduction of about 59%. By this inventive process modification is the total costs for chemical charge reduced down to some 64 USD per ton of lignin produced, which is less than 50% of the cost for using the Original Lignoboost process solution.

|  | "Original Lignoboost" | RT(gas) | RT(gas) + GP | RT(gas) + GP + GP(gas) |
|---|---|---|---|---|
| $CO_2$ | 33.18 | 23.23 | 23.23 | 9.7 |
| $H_2SO_4$ | 17.48 | 17.48 | 17.48 | 17.48 |
| NaOH | 81.9 | 81.9 | 0 | 0 |
| $CaCO_3$ | n.a. | n.a. | 14 | 14 |
| $CaSO_4$ | n.a. | n.a. | 4 | 4 |
| Formic acid | n.a. | n.a. | 20 | 20 |
| Σ Prod cost USD/ton lignin | 132.6 | 122.6 | 77.8 | 64.4 |

If then also lime kiln gases are used as a $CO_2$ source for precipitation stage, could the cost for $CO_2$ be reduced significantly, or even be totally eliminated.

It is to be noted that only a part of the lignin content is sought for precipitation, as the residual black liquor $BL_{OUT}$ is sent to the conventional recovery process, and thus a certain amount of lignin is needed in order to maintain some of the combustible content, i.e. heat value, for the recovery boiler. Thus, it is of importance that the residual black liquor after the precipitation process still is alkaline and do not add problems in the subsequent recovery process. The Lignoboost process is thus ideal for overloaded mills where the recovery operations in the evaporation plant or in the recovery boiler has reached its operational limit, and further capacity for handling increased black liquor volumes is needed. Instead could the capacity of the pulping process be increased, and the increased black liquor volumes are met with a complementary process producing a "green" fuel of great value.

While the present invention has been described in accordance with preferred compositions and embodiments, it is to be understood that certain substitutions and alterations may be made thereto without departing from the spirit and scope of the following claims.

We claim:

1. A method for separation of lignin from original black liquor ($BL_{IN}$) handled in chemical recovery operations with evaporation stages receiving black liquor from a digester, said original black liquor having a first pH value, comprising the following phases in sequence:

a first precipitation stage (PR) wherein an acidifier charge, comprising carbon dioxide, is added to the original black liquor in order to decrease the first pH value of the original black liquor to a second pH level and to initiate precipitation of lignin wherein the second pH level is above pH 7 and below 11.5, followed by a separation phase ($FP_1$) wherein the precipitated lignin is separated as a lignin cake from a remaining alkaline liquid phase ($BL_{out}$) of the acidified original black liquor, and sending the remaining liquid phase ($BL_{out}$) of the acidified original black liquor back to the evaporation stages in the chemical recovery operations, suspending the lignin cake in a strong sulfuric acid solution establishing a pH level below 5 and maintaining the acidified lignin slurry in this slurry state for at least 2 minutes, dewatering the acidified lignin slurry ($FP_2$) obtaining a second lignin cake (LP) and at least one acidic liquid phase ($FL_1$);

subjecting the acidic liquid phase ($FL_1$) to a sulfur removal process wherein a calcium containing compound is added to the acidic liquid phase to reach a pH level of 5-8, whereby sulfur in the acidic liquid phase is reacting with the calcium containing compound forming solid gypsum, separating the solid gypsum (WG) from the acidic liquid phase and bleeding out the solid gypsum from the chemical recovery operations while sending the remaining liquid phase ($FL_2$) with reduced sulfur content to alkaline recovery operations; and using at least a part of the carbon dioxide released in the sulfur removal process as part of the acidifier charge added to the original black liquor.

2. A method according to claim 1 wherein the calcium containing compound is calcium carbonate and that carbon dioxide is formed during the reaction.

3. A method according to claim 1 wherein the calcium containing compound is calcium acetate and that carbon dioxide is formed during the reaction and wherein at least a part of the carbon dioxide released in the sulfur removal process is used as part of the acidifier charge added to the original black liquor.

4. A method according to claim 2 wherein in the sulfur removal process acid is added in order to maintain the sulfur removal process acidic and decrease the solubility of gypsum.

5. A method according to claim 4 wherein the acid added to the sulfur removal process is an organic acid.

6. A method according to claim 5 wherein the organic acid is acetic acid or formic acid or citric acid.

7. A method according to claim 1 wherein the separated solid gypsum is washed in order to wash out any residual sodium from the solid gypsum.

8. A method for separation of lignin from original black liquor ($BL_{IN}$) handled in chemical recovery operations with evaporation stages receiving black liquor from a digester, the original black liquor having a first pH value, comprising the following phases in sequence:

a first precipitation stage (PR) wherein an acidifier charge, comprising carbon dioxide, is added to the original black liquor in order to decrease the first pH value of the original black liquor to a second pH level and to initiate precipitation of lignin wherein the second pH level is above pH 7 and below 11.5, followed by a separation phase ($FP_1$) wherein the precipitated lignin is separated as a lignin cake from a remaining alkaline liquid phase ($BL_{out}$) of the acidified original black liquor, and sending the remaining liquid phase ($BL_{out}$) of the acidified original black liquor back to the evaporation stages in the chemical recovery operations, suspending the lignin cake in a strong sulfuric acid solution establishing a pH level below 5 and maintaining the acidified lignin slurry in this slurry state for at least 2 minutes, dewatering the acidified lignin slurry ($FP_2$) obtaining a second lignin cake (LP) and at least one acidic liquid phase ($FL_1$);

subjecting the acidic liquid phase ($FL_1$) to a sulfur removal process wherein a calcium containing compound and an acid are added to the acidic liquid phase to reach a pH level of 5-8, whereby sulfur in the acidic liquid phase is reacting with the calcium containing compound forming solid gypsum, and separating the solid gypsum (WG) from the acidic liquid phase and bleeding out the solid gypsum from the chemical recovery operations while sending the remaining liquid phase ($FL_2$) with reduced sulfur content to alkaline recovery operations.

* * * * *